Figure 1:
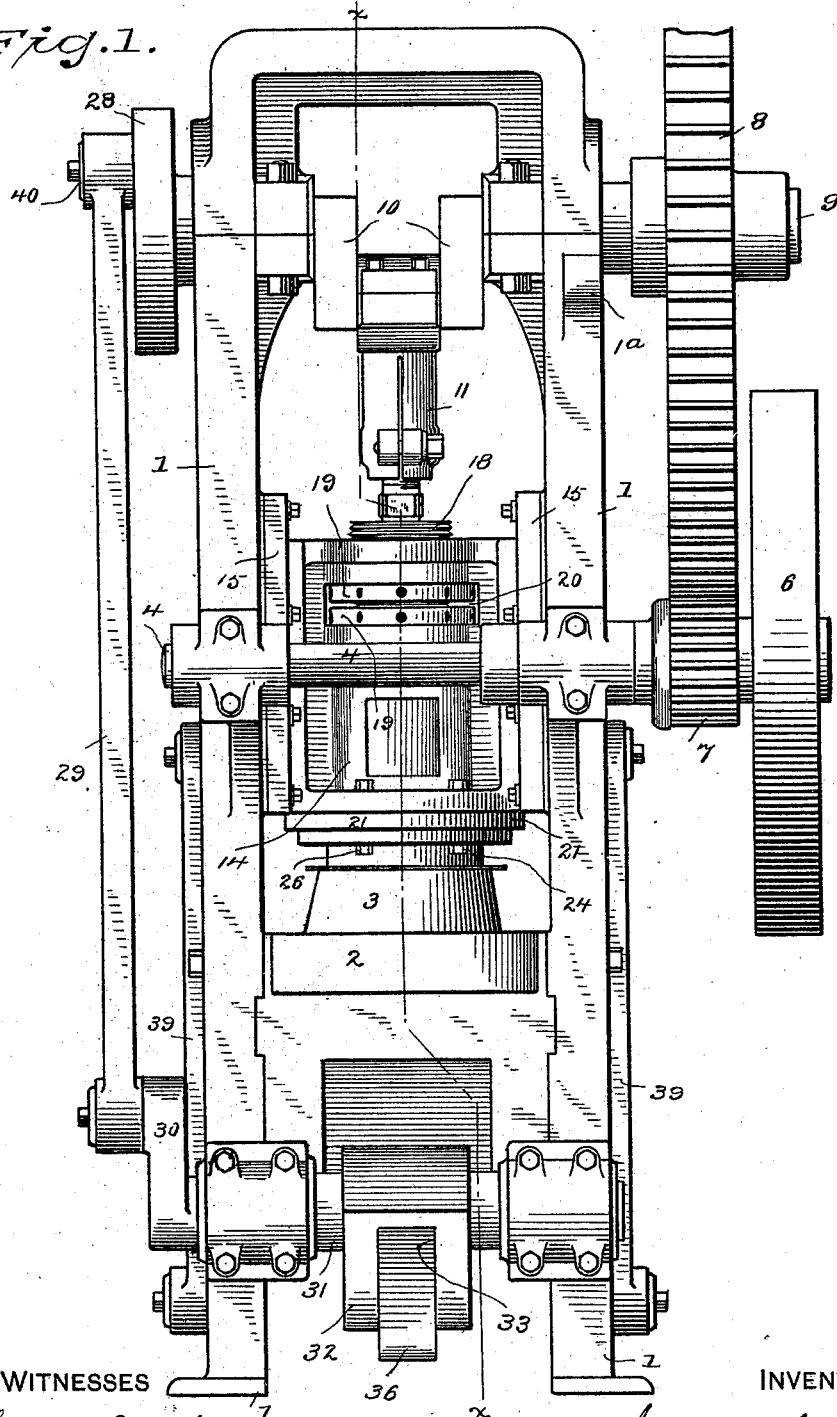

(No Model.) 6 Sheets—Sheet 1.

A. C. CAMPBELL.
DOUBLE ACTING TOGGLE PRESS.

No. 519,174. Patented May 1, 1894.

WITNESSES
H. A. Lamb
Pearl Reynolds

INVENTOR
Andrew C. Campbell
By A. M. Wooster
Atty.

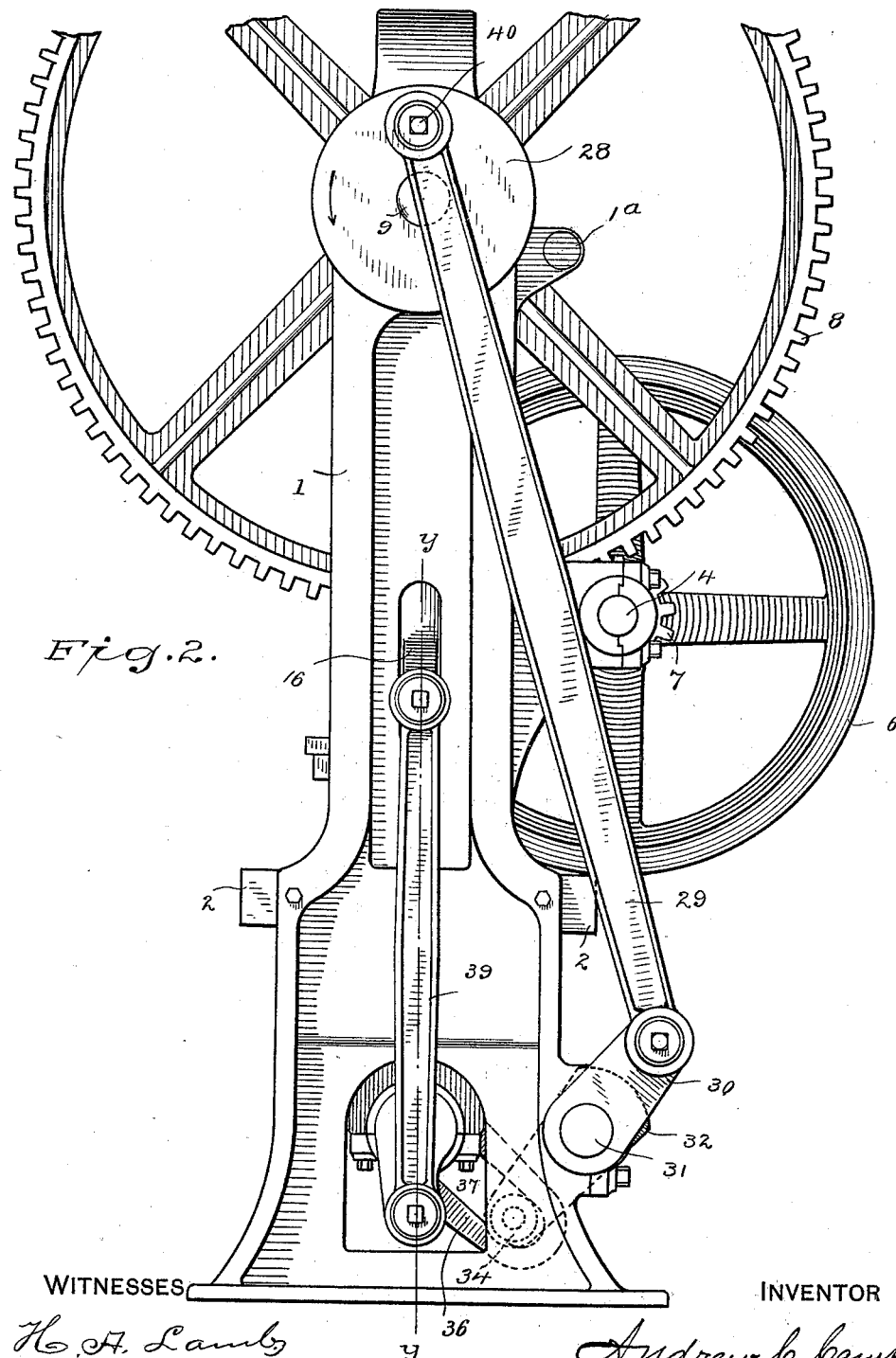

(No Model.) 6 Sheets—Sheet 3.

A. C. CAMPBELL.
DOUBLE ACTING TOGGLE PRESS.

No. 519,174. Patented May 1, 1894.

WITNESSES
H. A. Lamb
Pearl Reynolds

INVENTOR
Andrew C. Campbell
By A. M. Wooster
Atty.

THE NATIONAL LITHOGRAPHING COMPANY,
WASHINGTON, D. C.

(No Model.)  6 Sheets—Sheet 4.

A. C. CAMPBELL.
DOUBLE ACTING TOGGLE PRESS.

No. 519,174.  Patented May 1, 1894.

WITNESSES  
H. A. Lamb  
Pearl Reynolds

INVENTOR  
Andrew C. Campbell  
By A. M. Wooster  
Atty.

THE NATIONAL LITHOGRAPHING COMPANY,  
WASHINGTON, D. C.

(No Model.) 6 Sheets—Sheet 5.

A. C. CAMPBELL.
DOUBLE ACTING TOGGLE PRESS.

No. 519,174. Patented May 1, 1894.

WITNESSES
H. A. Lamb
Pearl Reynolds

INVENTOR
Andrew C. Campbell
By
A. M. Wooster
Atty.

(No Model.) 6 Sheets—Sheet 6.

A. C. CAMPBELL.
DOUBLE ACTING TOGGLE PRESS.

No. 519,174. Patented May 1, 1894.

WITNESSES
H. A. Lamb
Pearl Reynolds

INVENTOR
Andrew C. Campbell
By A. M. Wooster
Atty.

THE NATIONAL LITHOGRAPHING COMPANY,
WASHINGTON, D. C.

UNITED STATES PATENT OFFICE.

ANDREW C. CAMPBELL, OF WATERBURY, CONNECTICUT, ASSIGNOR TO THE WATERBURY FARREL FOUNDRY AND MACHINE COMPANY, OF SAME PLACE.

DOUBLE-ACTING TOGGLE-PRESS.

SPECIFICATION forming part of Letters Patent No. 519,174, dated May 1, 1894.

Application filed January 2, 1894. Serial No. 495,324. (No model.)

*To all whom it may concern:*

Be it known that I, ANDREW C. CAMPBELL, a citizen of the United States, residing at Waterbury, in the county of New Haven and State of Connecticut, have invented certain new and useful Improvements in Double-Acting Toggle-Presses; and I do hereby declare the following to be a full, clear, and exact description of the invention, such as will enable others skilled in the art to which it appertains to make and use the same.

My invention relates to presses for general work both heavy and light, but is especially adapted to heavy forming and stamping presses and has for its object to produce a double acting press constructed upon the toggle principle which shall be simple and durable, in which great strength and power shall be combined with a long dwell and with lightness and quickness of movement, in which serious strain shall be removed from the upper part of the frame all of the heavy parts being near the floor, and in which a fixed and uniform pressure shall be placed upon the blank which shall be wholly unaffected by strain produced by the drawing punch, all the holding strain being taken by vertical links at the sides of the machine and not being affected to the slightest extent by the drawing action as in ordinary presses.

With these ends in view my invention consists in the special construction and combination of parts which is hereinafter fully described and then specifically pointed out in the claims.

Figure 4:
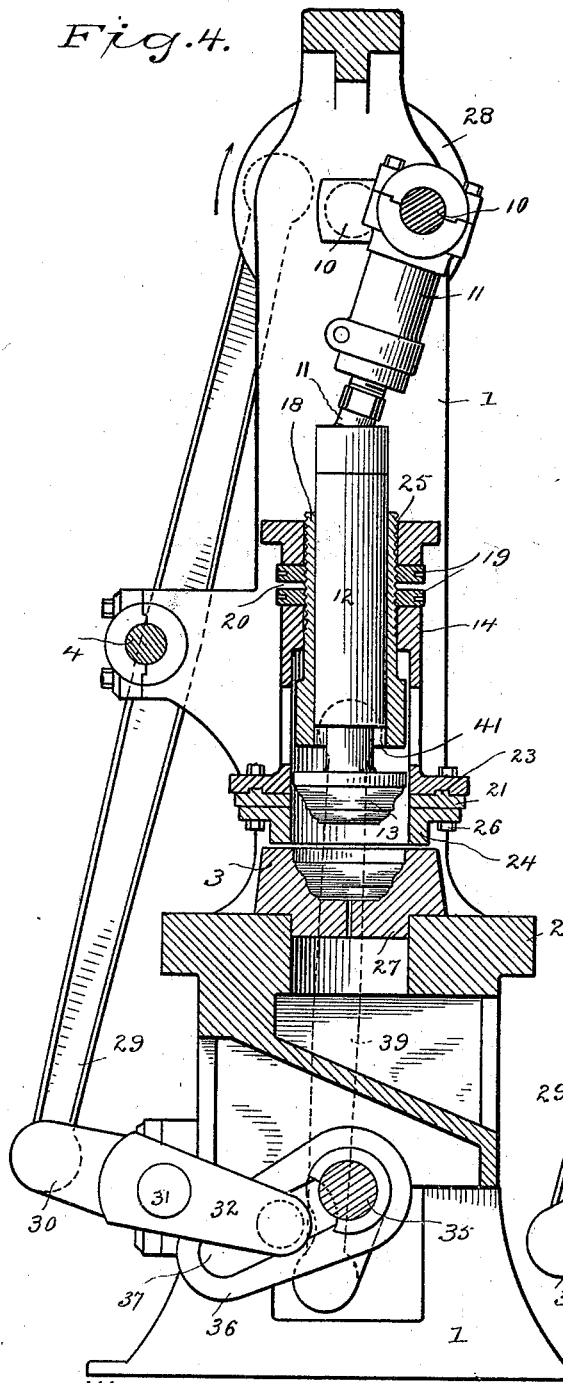
Figure 3:
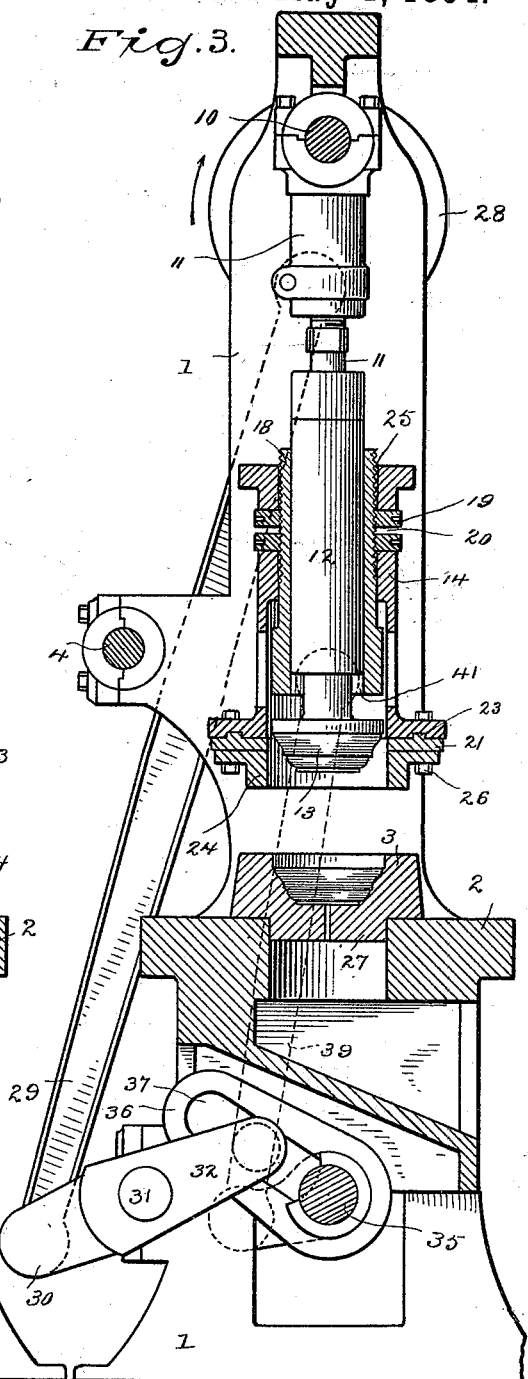
Figure 5:
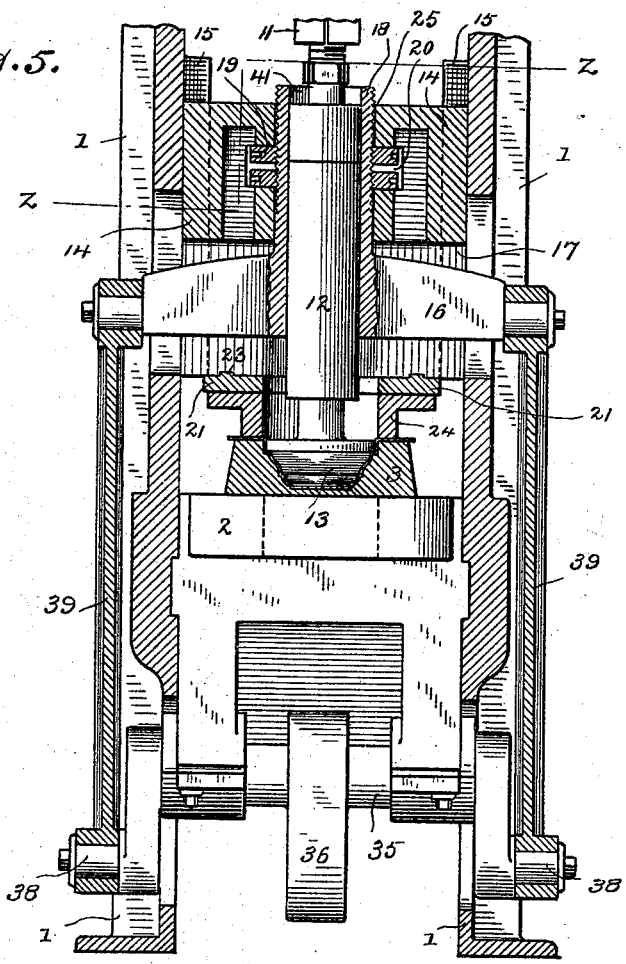
Figure 6:
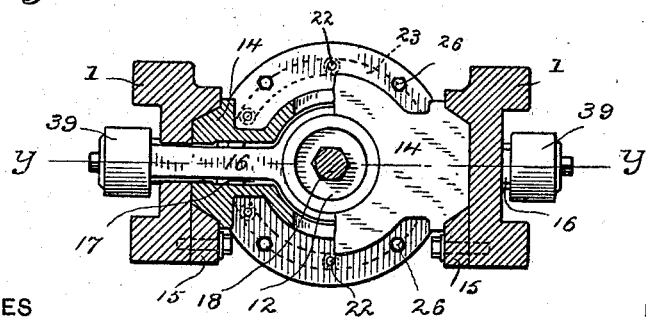
Figure 7:
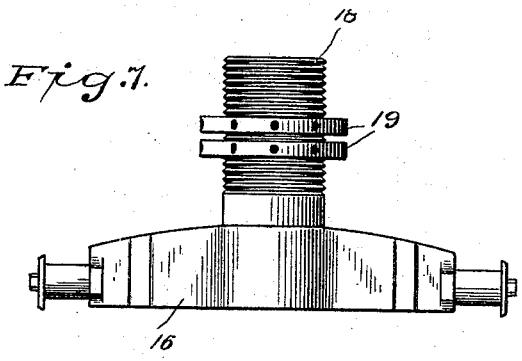
Figure 9:
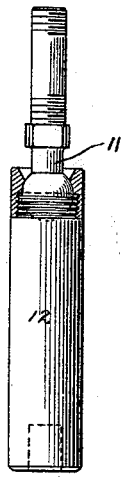
Figure 8:
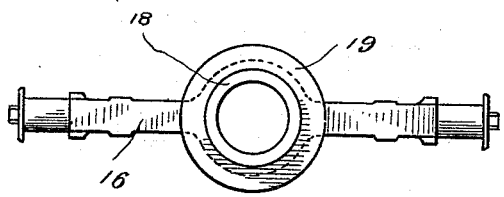
Figure 10:
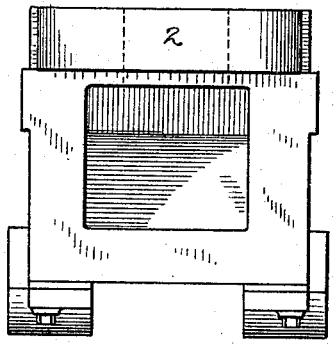
Figure 11:
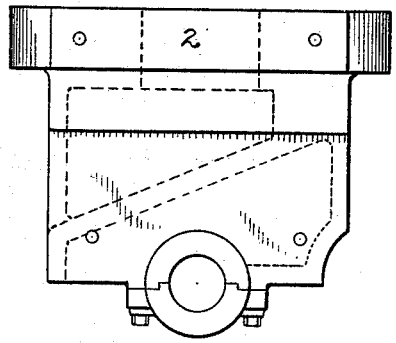
Figure 14:
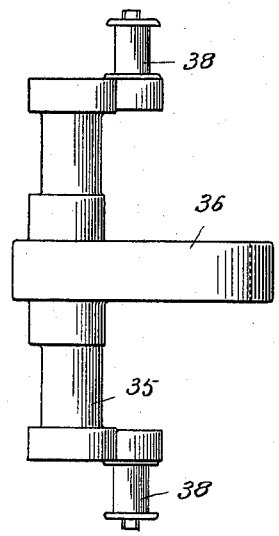
Figure 12:
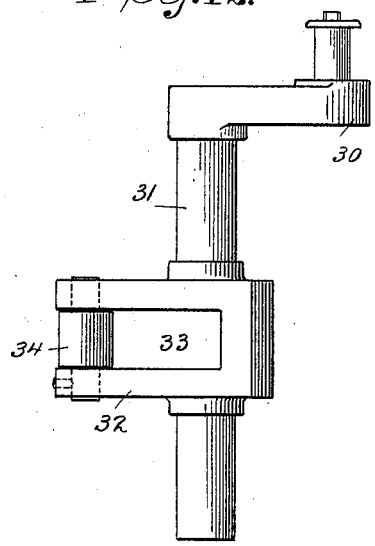
Figure 15:
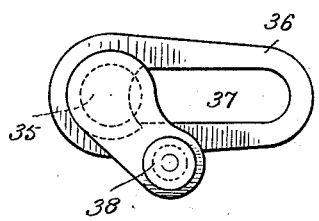
Figure 13:
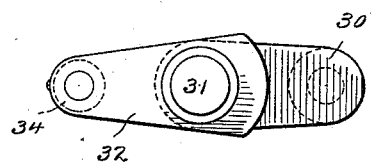

In the accompanying drawings forming part of this specification Figure 1 is a rear elevation of my novel press, the forming die and the blank holder being at their lowest positions. Fig. 2 is a side elevation as seen from the left in Fig. 1 the position of the parts corresponding with said figure. Fig. 3 is a section on the line $x\,x$ in Fig. 1 the forming die and blank holder being at their highest positions, the downward movement being about to commence. Fig. 4 is a similar view, the downward movement of the forming die and blank holder having proceeded until the blank holder is approximately in operative position, and the forming die about to act. Fig. 5 is a section on the line $y\,y$ in Fig. 2 looking toward the right the position of the parts corresponding with Figs. 1 and 2. Fig. 6 is a section on the line $z\,z$ in Fig. 5 looking down. Figs. 7 and 8 are respectively an elevation and plan view of the draw bar. Fig. 9 is a view showing the connection of the main crank rod to the die carrier. Figs. 10 and 11 are respectively a front and side elevation of the table. Figs. 12 and 13 are respectively a plan view and end elevation of the primary rock shaft, and, Figs. 14 and 15 are respectively a plan view and end elevation of the secondary rock shaft.

1 denotes the framework of the press which may be of any ordinary or preferred construction, $1^a$ a bracket for the attachment of a suitable clutch, not shown in the drawings, 2 the table and 3 the lower die.

4 denotes the power shaft which receives motion from a belt, not shown, passing over a belt pulley 6.

7 is a pinion on shaft 4 which meshes with a gear wheel 8 on a shaft 9 near the top of the framework which I term the main shaft.

10 denotes a crank at the mid-length of shaft 9, 11 the corresponding crank rod and 12 the carrier for the upper die 13 with which crank rod 11 is connected by a ball and socket joint, see Fig. 9.

14 denotes the gate which moves in ways in the framework being retained therein by guides 15 see Fig. 6.

16 denotes the draw bar which lies in a recess 17 in the gate.

18 is a threaded hub which is secured to or preferably cast integral with the draw bar and which extends upward through an opening 25 in the gate. This hub is provided with a central opening 41 in which carrier 12 moves freely. The draw bar is adjustably secured to the gate by means of nuts 19 which lie in a recess 20 in the gate. The purpose of this adjustment is to regulate the closeness of approach of the blank holder to the lower die as will presently be fully explained. 21 denotes a plate secured to the gate by screws 22. In order to make this plate perfectly rigid with the gate it is provided with a circular rib 23, see Fig. 5, which engages a corresponding groove in the gate.

24 denotes the blank holder which is secured to the gate by bolts 26 passing through the blank holder, plate 21 and through the lower flange of the gate, see Figs. 1, 3 and 4. The lower die is provided with a hub 27 which engages a corresponding opening in the table. The operation of the upper die will be clearly understood from the drawings.

Carrier 12 slides freely in the threaded hub wholly independently of the movements of the gate, the carrier receiving motion from crank 10 and crank rod 11, and the gate carrying the blank holder receiving motion in the manner which I will now describe.

At the end of shaft 9 opposite to gear wheel 8 is a disk 28 carrying a crank pin 40 on which a crank rod 29 is pivoted. The other end of crank rod 29 is connected to a crank 30 on a shaft 31 which I have referred to as the primary rock shaft. This shaft is journaled at the rear of the framework near the base thereof and is provided at its mid-length with a toggle arm 32 which is provided with a slot 33 having journaled at its outer end a roller 34. 35 denotes another shaft journaled near the base of the machine at about the center thereof which I have referred to as the secondary rock shaft. This shaft has at its mid-length a toggle arm 36 provided with a closed slot 37 in which roller 34 carried by toggle arm 32 slides, said parts being shown detached in Figs. 12 and 14 and in operative position in Figs. 3 and 4. At the ends of shaft 35 are cranks 38.

39 denotes links on opposite sides of the machine, one end of each link being attached to one of the cranks 38 and the opposite end to draw bar 16.

The operation is as follows: Each rotation of the main shaft causes an upward and downward movement of the upper die and also of the blank holder, the upper die being operated by means of the central crank on the main shaft and the blank holder being operated by the toggle arms. Crank 10 and crank pin 40 upon crank disk 28 are nearly opposite each other as shown in Figs. 1 and 4. When the crank pin is raised crank rod 29 is drawn upward, which by means of crank 30 oscillates primary rock shaft 31 and swings toggle arm 32 carrying roller 34 downward. This movement causes roller 34 to travel outward in slot 37 in toggle arm 36 thereby swinging toggle arm 36 downward and oscillating secondary rock shaft 35 downward also. This shaft carries the cranks 38 to which links 39 which operate the draw bar are connected. The operation of the blank holder will be apparent from Figs. 3 and 4 in connection with Figs. 2 and 5. In Figs. 2 and 5 the upper die and blank holder are both at their lowest positions, in Fig. 3 both upper die and blank holder are at their highest positions and in Fig. 4 said parts are at intermediate positions.

It will of course be obvious that the parts must be timed so that the blank holder will reach its operative position and will hold the blank firmly before the upper die begins to act, and that it must continue to hold the blank until after the upper die has ceased to act.

As already stated the action of the blank holder is caused by the upward movement of crank pin 40 and crank rod 29 acting through the toggle arms and links, while the action of the upper die is caused by the simultaneous downward movement of crank 10.

Having thus described my invention, I claim—

1. In a machine of the class described the combination with the gate having recesses 17 and 20 and an opening 25, of the draw bar lying in recess 17 and having a threaded hub lying in opening 25, and nuts 19 lying in recess 20 and engaging the threaded hub, whereby the gate may be adjusted relatively to the draw bar.

2. The combination with a lower die, a gate carrying a blank holder, the draw bar and means for adjustably connecting the gate to the draw bar so that the blank holder may be adjusted relatively to the lower die, of an upper die a suitable carrier therefor and means for reciprocating said carrier and die independently of the draw bar and the gate.

3. The combination with the upper and lower dies, the gate and the draw bar, of links 39 connected to the draw bar, a secondary rock shaft having cranks to which said links are connected and a toggle arm 36, a primary rock shaft having a toggle arm 32 engaging arm 36, and means for oscillating the primary rock shaft as and for the purpose set forth.

4. The combination with the upper and lower dies, the gate and the draw bar, of links 39 connected to the draw bar, a secondary rock shaft having cranks to which said links are connected, and a toggle arm 36 having a slot 37, a primary rock shaft having a toggle arm 32 carrying a roller engaging slot 37, and suitable means for oscillating the primary rock shaft whereby the blank holder is moved to operative position and retained there during the operation of the upper die.

5. The combination with the lower die, the upper die, a carrier therefor, shaft 9 having a crank 10, and crank pin 40 crank rod 11 engaging crank 10 by which the carrier is operated, and a crank rod 29 engaging crank pin 40, of a gate carrying a blank holder, a draw bar adjustably secured to the gate, links connected to the draw bar and to cranks 38, a secondary rock shaft carrying said cranks and having a toggle arm 36 and a primary rock shaft carrying a crank 30 to which crank rod 29 is connected and a toggle arm 32 engaging a toggle arm 36.

6. The combination with the lower die, the upper die, a carrier therefor, shaft 9 having a crank 10, and a crank pin 40, crank rod 11 engaging crank 10 by which the carrier is operated and a crank rod 29 engaging crank pin 40, of a gate carrying a blank holder, a draw bar having a threaded hub within which the carrier slides nuts engaging said hub by which the draw bar is adjustably connected to the gate, links connected to the draw bar and to cranks 38, a secondary rock shaft carrying said cranks and having a toggle arm 36 and a primary rock shaft carrying a crank 30 to which crank rod 29 is connected and a toggle arm 32 engaging toggle arm 36.

7. The combination with the lower die, the upper die, a carrier therefor, shaft 9 having a crank 10 and crank pin 40 crank rod 11 engaging crank 10 by which the carrier is operated, and a crank rod 29 engaging crank pin 40, of a gate carrying a blank holder, a draw bar adjustably secured to the gate, links connected to the draw bar and to cranks 38, a secondary rock shaft carrying said cranks and having a toggle arm 36 provided with a slot 37 and a primary rock shaft carrying a crank 30 to which crank rod 29 is connected and a toggle arm 32 having at its outer end a roller which engages the slot in toggle arm 36 whereby the blank holder is placed in operative position and retained there during the operation of the upper die.

8. In a press the combination with the gate, draw bar and blank holder, of links connected to the draw bar, a secondary rock shaft having cranks to which said links are connected and a toggle arm 36, a primary rock shaft having a toggle arm 32 engaging toggle arm 36 and suitable means for oscillating the primary rock shaft.

In testimony whereof I affix my signature in presence of two witnesses.

ANDREW C. CAMPBELL.

Witnesses:
GEO. ROWBOTTOM,
HENRY FINSTERWALD.